No. 748,321. PATENTED DEC. 29, 1903.
T. SUZUKI.
APPARATUS FOR MAKING ROCK CANDY.
APPLICATION FILED AUG. 5, 1903.
NO MODEL. 3 SHEETS—SHEET 2.

Witnesses. Inventor.

No. 748,321. PATENTED DEC. 29, 1903.
T. SUZUKI.
APPARATUS FOR MAKING ROCK CANDY.
APPLICATION FILED AUG. 5, 1903.
NO MODEL. 3 SHEETS—SHEET 3.

Witnesses.
E. Heymann
R. Winter.

Inventor.
Tozaburo Suzuki
by B. Singer
Att'y.

No. 748,321. Patented December 29, 1903.

UNITED STATES PATENT OFFICE.

TOZABURO SUZUKI, OF SUNAMURA, JAPAN.

APPARATUS FOR MAKING ROCK-CANDY.

SPECIFICATION forming part of Letters Patent No. 748,321, dated December 29, 1903.

Application filed August 5, 1903. Serial No. 168,302. (No model.)

*To all whom it may concern:*

Be it known that I, TOZABURO SUZUKI, a subject of the Emperor of Japan, residing at No. 401 Jibeishinden, Sunamura, county of Minami-Katsushika, Prefecture of Tokio, Japan, have invented certain new and useful Improvements in Apparatus for Manufacturing Rock-Candy Sugar, of which the following is a specification.

This invention relates to apparatus for manufacturing rock-candy sugar, wherein the saccharine juices in small flat vessels are subjected in a vacuum-pan to the action of heated air admitted intermittently to the lower part of the pan and drawn out continuously from the upper part thereof in order to produce a varying pressure in the vacuum-pan.

The object of this invention is to produce an apparatus wherein substantially all of the sugar will be rapidly crystallized without leaving a syrup or molasses.

Figure 1:
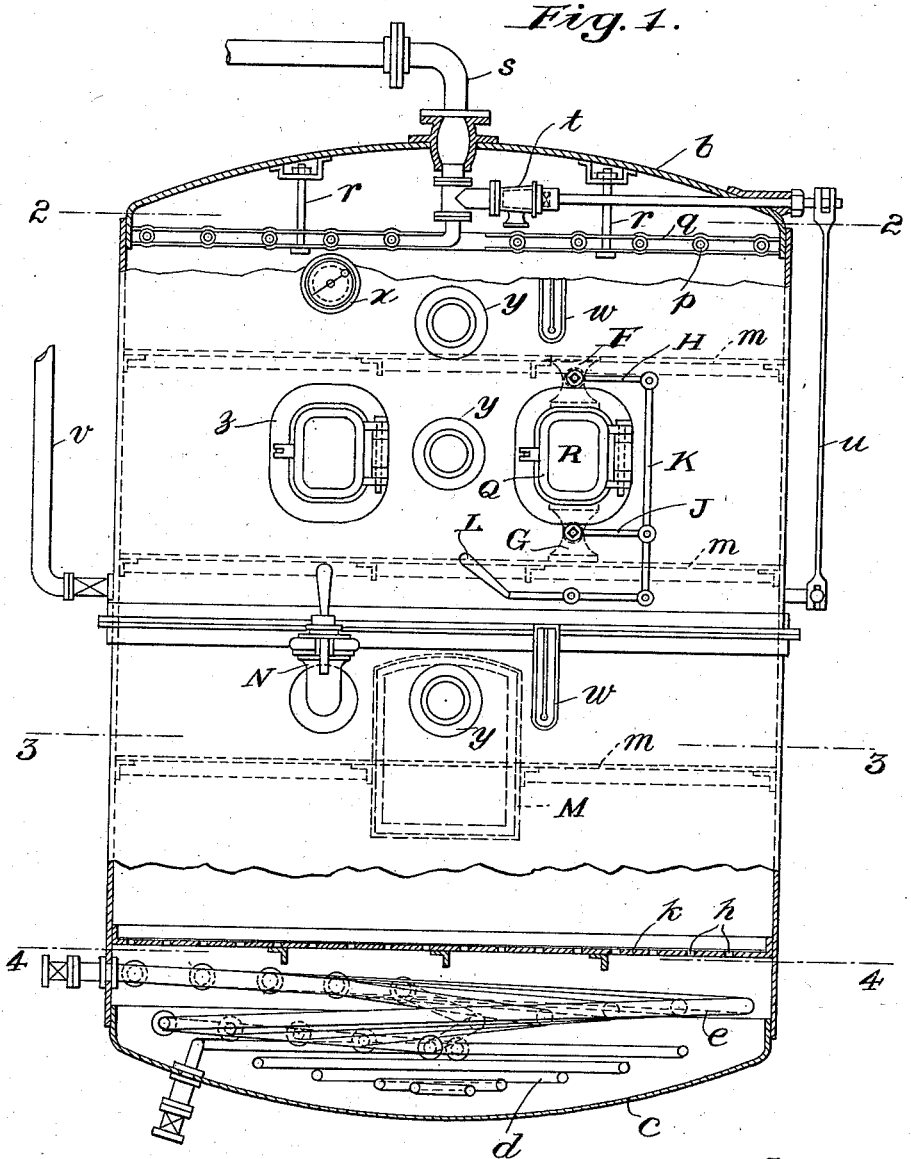
Figure 2:
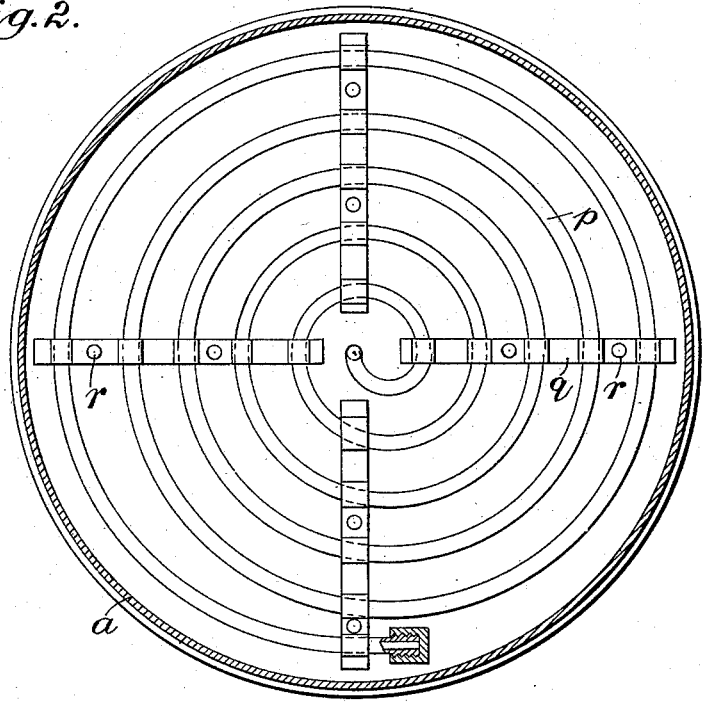
Figure 3:
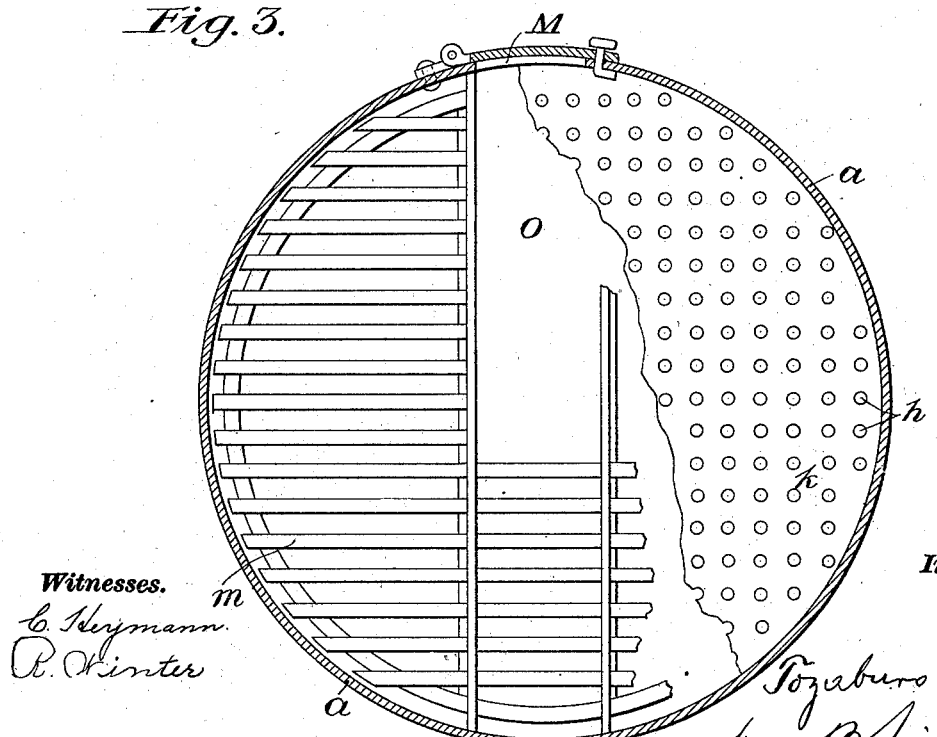
Figure 5:
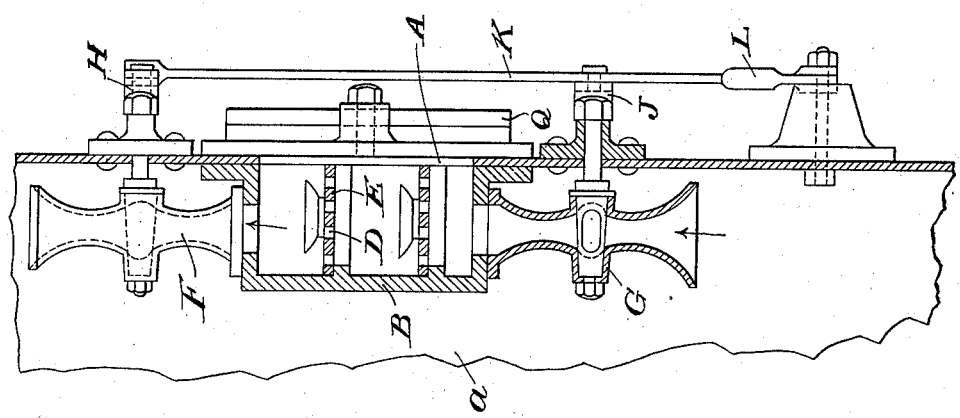
Figure 4:
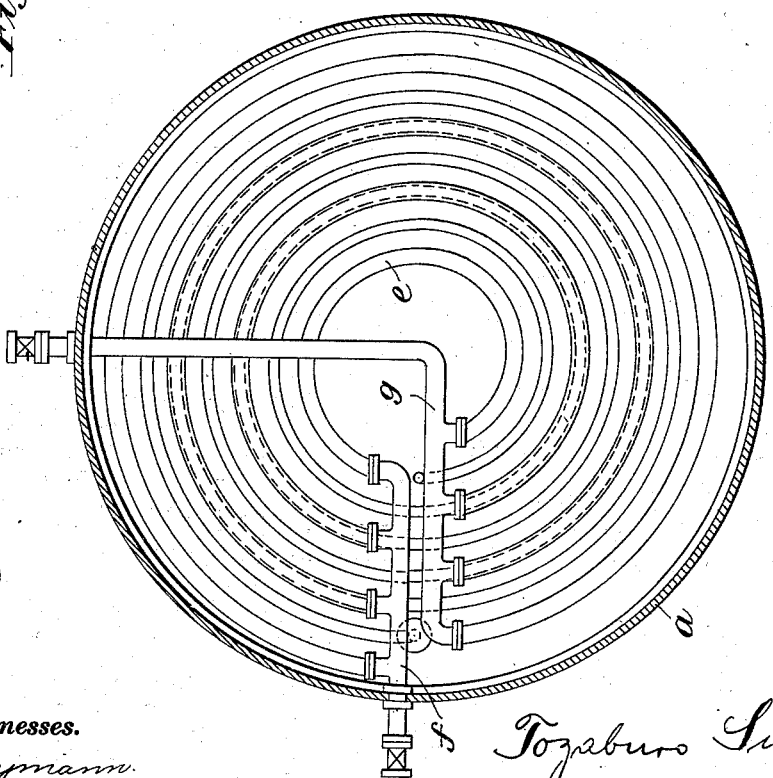

In the accompanying drawings, showing a device embodying this invention, Figure 1 is a front elevation of a vacuum-pan with parts broken away to show the interior apparatus. Fig. 2 is a sectional view on line 2 2 of Fig. 1. Fig. 3 is a similar view on line 3 3 of Fig. 1. Fig. 4 is a similar view on line 4 4 of Fig. 1. Fig. 5 is a longitudinal section showing the means for examining the process of crystallization.

A cylindrical vacuum-pan $a$ is provided with a top $b$ and bottom $c$. The lower part of the pan is provided with an air-inlet tube $d$. This is provided with a regulating-valve outside of the pan to regulate or cut off the flow of air therein. The upper surface of the tube $d$ is perforated with small holes through which the air is drawn into the pan. Immediately above the tube $d$ are steam-pipes $e$, adapted to heat the air entering through the tubes. The steam-pipes $e$ consist of a number of annular pipes, as shown in Fig. 4, one end of each being connected with an inlet-pipe $f$ and the other end connected with an exhaust-pipe $g$, and both inlet and exhaust pipes are provided with regulator-valves. Above the steam-pipes is a partition $k$, having a number of perforations $h$ therein. The interior of the operating part of the pan is provided with a series of shelves $m$, which are made of lattice-work and are adapted to receive the small flat vessels in which saccharine juices are put for crystallizing. A portion of the shelves are cut away at $o$ to form a perpendicular manhole to the series of shelves sufficiently large to allow an operator to stand therein.

The upper part of the pan $a$, as shown in Fig. 2, is provided with a suction-pipe $p$, which is held by means of cross-bars $q$, supported from the top $b$ by means of rods $r$. The lower side of the pipe is perforated, so that the air will be drawn equally from all parts of the pan. One end of the suction-pipe is closed, while the other end is connected with a vacuum-pump by means of an exhaust-pipe $s$. A branch of this pipe within the pan is provided with a cock $t$, opening into the pan and capable of being closed and opened by means of a handle $u$ outside of the pan.

The vacuum-pan is provided with means for examining the process of crystallization of the sugar, as shown in Fig. 5. This device consists of an opening in the periphery of the pan $a$, which is closed to the interior of the pan by a casing B to form a small chamber. In the chamber are a series of shelves E E, which are perforated at D. The chamber may be placed in communication with the interior of the pan by means of cocks F and G, opening into the chamber. The stems of the cocks F and G project out through the wall of the pan $a$ and are provided with arms H and J, which are connected at their extremities by means of a bar K. The bar K is connected with a handle L, which is pivoted to the pan and by means of which the cocks are opened or closed. The opening A is provided with a door Q, in which a glass plate R is secured.

The syrup is delivered into the pan through a delivery-pipe V. The pan is also provided with a thermometer W, pressure-gage X, light-windows Y, a glass door Z for examining the crystallization process, a door M for admitting an operator, and an air-valve N.

In manufacturing rock-candy sugar with this apparatus the operator enters the pan through the door M and fills a number of small flat vessels with the saccharine juice, which is delivered through pipe V. These vessels are arranged on the shelves $m$, and the operator then leaves the pan and hermetically closes the door M. The door Q is opened and the dishes filled with saccharine juice are placed on the shelves E, after which this door is also tightly closed. The cocks F and G are then opened by means of handle L, and the cock $t$ is also opened by means of the handle $u$. The vacuum-pump is then started and the air exhausted out through the pipe $s$. Simultaneously steam is admitted through the pipe $e$. When the pressure of the pan reaches to about three to five pounds, the cock $t$ is closed, and the air is then drawn out through the perforated suction-pipe $p$. The air entering through the tube $d$ is intermittently cut off by opening and closing the valve provided for this tube. In this way the air is constantly being drawn out at the upper part of the pan and is intermittently admitted at the lower part thereof, thereby causing the pressure in said pan to be intermittently lowered and raised. At the same time the steam is constantly admitted through the steam-pipe $e$; but the effect of the action of the heat upon the saccharine juice in the pan differs according to the pressure, and therefore acording to the amount of air admitted into the pan. By means of this apparatus the pressure and temperature can be readily governed by regulating the motion of the vacuum-pump, the amount of air admitted, and the amount of steam supplied.

The air-inlet tube $d$ and steam-pipe $e$ of this device are shown as simple means of accomplishing the process set forth; but other means will readily suggest themselves as being applicable for the same purpose.

While the saccharine juice is being evaporated and crystallized the condition of crystallization may be observed through the glass door Z. To more carefully examine the condition of crystallization, the cocks F and G are closed by means of the handle L. The door Q is opened, and the small vessels are taken from the shelves and their contents carefully examined. When the juice in the vessels is thoroughly crystallized, the steam is shut off and the air-valve N is opened to admit air into the pan. Then by continuing the operation of the vacuum-pump the interior of the pan will be rapidly cooled by the passage of the air therethrough. When the cooling is completed, the door M is opened and the operator enters to take out the crystallized candy in the small vessels. These vessels are again filled with the juice and the operation repeated, as above described.

By means of this apparatus much less time is required and the juice is more thoroughly crystallized than by present methods of manufacturing.

Having thus described my invention, what I claim as new, and desire to secure by Letters Patent, is—

1. In a vacuum evaporating-pan, the combination of a closed receptacle, an air-inlet pipe in the bottom of said receptacle comprising a perforated coil, steam heating-pipes arranged above said air-inlet pipe, a perforated partition over said steam-pipes, reticulated shelves in said receptacle for holding evaporating-pans, and means for exhausting the air from said receptacle.

2. In a vacuum evaporating-pan, the combination of a closed receptacle, means for intermittently introducing heated air into the bottom of said receptacle, means for supporting dishes for the liquid to be evaporated and means comprising a coiled perforated pipe in connection with an exhaust-pipe for continuously drawing the air out of said receptacle.

3. In a saccharine-juice evaporating and crystallizing apparatus, the combination of a closed receptacle, a perforated air-inlet pipe, in the bottom of said receptacle, means for governing the flow through said pipe, steam heating-pipes in said receptacle, means for governing the flow through said steam-pipes, a perforated partition over said steam-pipes, lattice-work shelves in said receptacle for holding evaporating-dishes, a manhole leading to said shelves, a liquid-supply pipe, an air-exhaust pipe comprising a perforated coil, a pipe leading from said coil to an exhauster, a cock from said last-named pipe opening into said chamber, and means for opening and closing said cock.

4. In combination with an evaporating-receptacle, a closed chamber in said receptacle, a door opening through the receptacle-wall into said chamber, dish-supports in said chamber, valves opening from the top and bottom of said chamber into said receptacle and means without said receptacle for opening and closing said valves for the purpose described.

In testimony whereof I affix my signature in presence of two witnesses.

TOZABURO SUZUKI.

Witnesses:
R. S. MILLER,
CHUJIRA KOCHI.